VIDEO SIGNAL CIRCUIT FOR NOISE LIMITING

Filed April 1, 1946 2 Sheets-Sheet 1

INVENTOR
Alda V. Bedford
BY H. S. Grover
ATTORNEY

July 4, 1950 A. V. BEDFORD 2,514,022

VIDEO SIGNAL CIRCUIT FOR NOISE LIMITING

Filed April 1, 1946 2 Sheets-Sheet 2

INVENTOR
Alda V. Bedford
BY H. S. Grover
ATTORNEY

Patented July 4, 1950

2,514,022

UNITED STATES PATENT OFFICE 2,514,022

VIDEO SIGNAL CIRCUIT FOR NOISE LIMITING

Alda V. Bedford, Princeton, N. J., assignor to Radio Corporation of America, a corporation of Delaware Application April 1, 1946, Serial No. 658,600

9 Claims. (Cl. 178—44)

The present invention relates to television systems, and more particularly relates to a method and means for reducing the effect of spurious high-frequency components, such as noise, which may be present in the video signal circuit of such systems.

High-frequency noise mixed with the video signal causes small or tiny random dots and flashes to appear in the reproduced image. It also changes the half-tone values of the image by making the darker areas appear less dark than without noise. As a result, the overall reproducing qualities of the system are lowered.

Arrangements have been proposed wherein such undesired high-frequency components of the video signal may be broadly attenuated. While such an expedient is effective in reducing the noise, it accomplishes this object at the expense of resolution in all areas of the image.

According to a feature of the present invention, spurious high-frequency components are reduced in amplitude only in the video signal regions corresponding to dark gray and black. Hence, resolution in the lighter image areas is not adversely affected. Furthermore, since a reduction of noise in the dark gray and black areas causes these portions to appear darker to an observer, it follows that the contrast, or tone value, of the reproduced image is improved.

One object of the present invention, therefore, is to provide a method and means for reducing the effect of spurious high-frequency components which may be present in the video signal circuits of a television system.

A further object of the invention is to improve the contrast of the reproduced image by reducing the amplitude of spurious high-frequency components only in the video signal regions corresponding to dark gray and black, whereby the standard of resolution in the lighter areas of the image is maintained.

Other objects and advantages will be apparent from the following description of preferred forms of the invention and from the drawings, in which.

Figures 1, 2, 4, 5, 6:
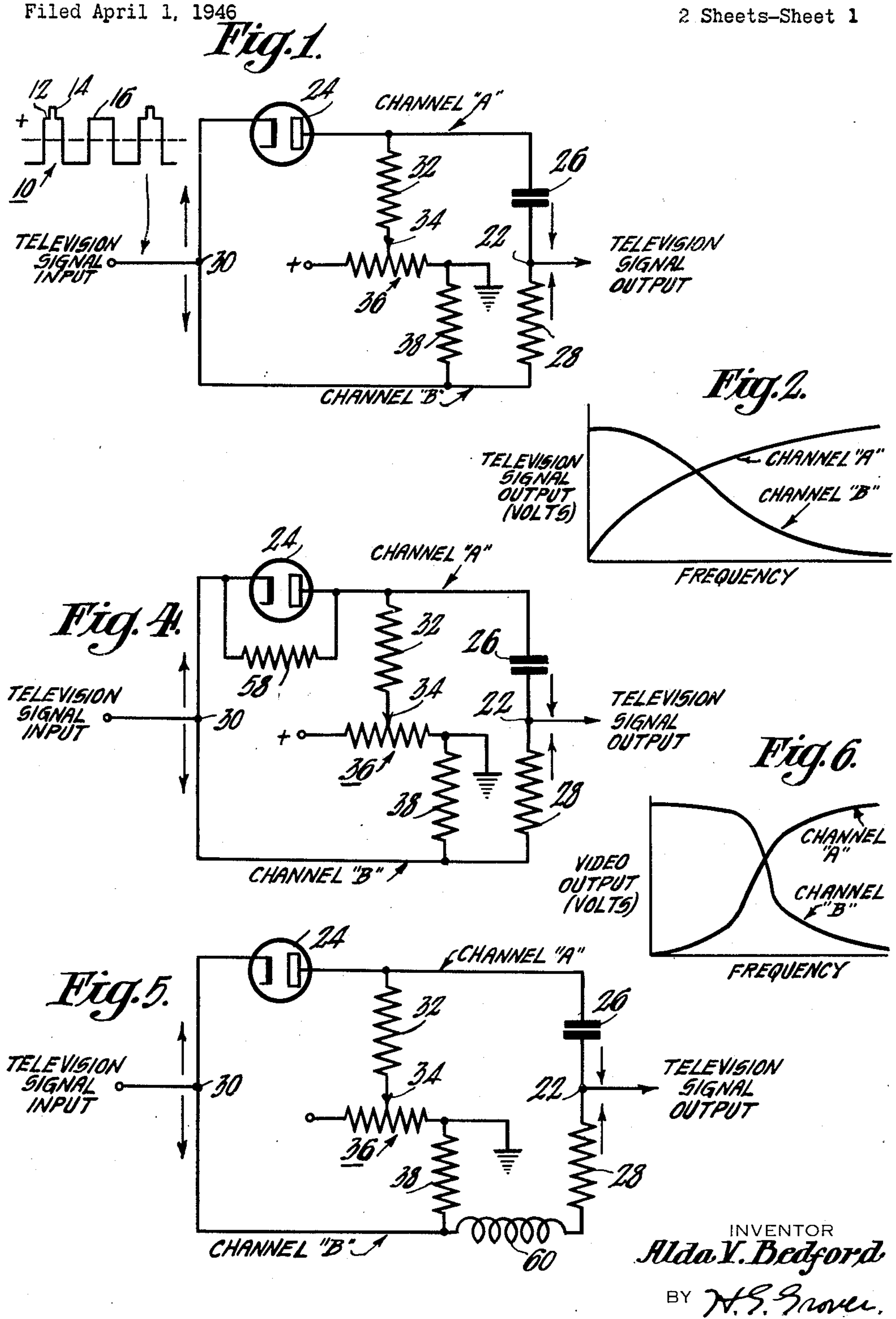
Fig. 1 is a circuit diagram of a preferred embodiment of the present invention.
Fig. 2 is a graph of output vs. frequency for the two channels of the circuit of Fig. 1.
Figs. 4 and 5 are modifications of Fig. 1.
Fig. 6 is a graph of output vs. frequency for the circuit of Fig. 5.

Referring now to Fig. 1, there is shown a circuit portion of a television system in accordance with the present invention. The input to the illustrated circuit comprises a composite television signal, the waveform of which may, for example, be such as generally indicated by the reference numeral 10. A television signal of this nature may be obtained through the use of components now known in the art.

Figure 3:
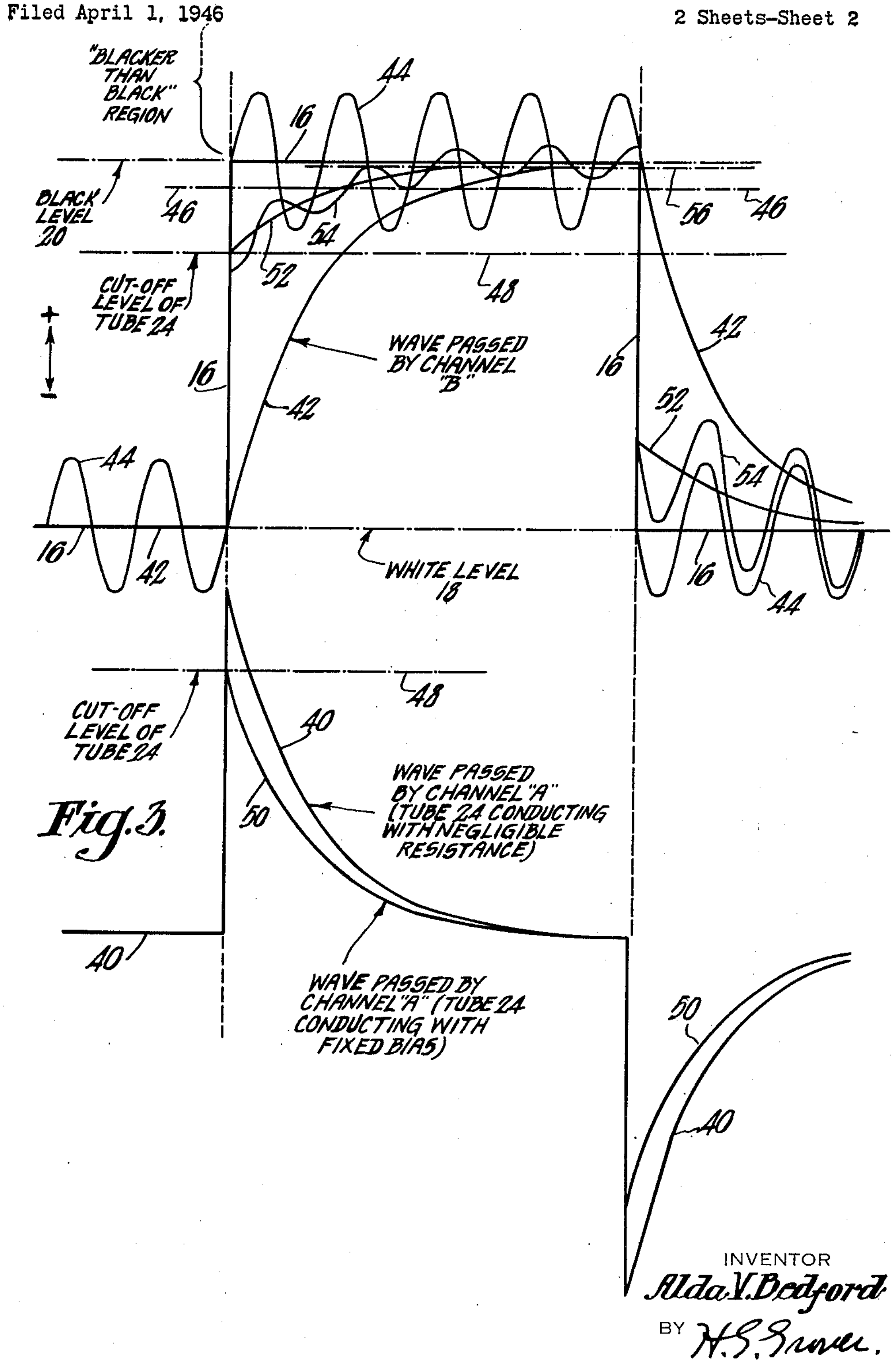
Fig. 3 is a set of waveforms useful in explaining the operation of the circuit of Fig. 1.

Each cycle of the signal wave 10 includes a blanking pedestal 12, a line synchronizing pulse 14, and a video signal component 16. This video signal component 16, also illustrated in Fig. 3, is chosen for the purpose of describing the present invention to be of substantially rectangular configuration, and extends from white level (indicated by the broken line 18 in Fig. 3) to black level (indicated in Fig. 3 by the broken line 20). It therefore corresponds in the reproduced image to a black area on a white background.

The circuit of Fig. 1 is so designed that the high-frequency components of the input wave 10 reach the output terminal 22 by means of channel A, which includes an electron discharge tube 24 and a capacitor 26. The low-frequency components of the input wave 10 reach the output terminal 22 by means of channel B, which includes a resistor 28.

Tube 24, which has been illustrated as a diode, but which, if desired, may be of any other suitable type, has its cathode connected to the input terminal 30 and its anode connected to one plate of capacitor 26. A positive potential is applied to the anode of tube 24 through a resistor 32, one terminal of which is connected to the anode of tube 24, and the other terminal of which is joined to an adjustable tap 34 on a potentiometer 36. The ends of the resistor element of potentiometer 36 are connected respectively to ground and to a suitable voltage source (not shown) of which the positive terminal is connected as indicated and of which the negative terminal is assumed to be at ground potential, so that by adjusting the position of tap 34, the voltage applied to the anode of tube 24 may be varied.

A further resistor 38 has one terminal connected to ground and the other terminal connected to intermediate point 30 and resistor 28.

When tube 24 is conducting so that it has negligible resistance, the two channels A and B have substantially the pass characteristics shown in Fig. 2. For the purpose of the present invention, these characteristics may be assumed to be complementary in an additive sense in that the output signal at point 22 is substantially identical to the input signal at point 30, when tube 24 is conducting and has negligible resistance. For this condition a wave such as 40 (Fig. 3) will be passed by channel A and a complementary wave such as 42 will be passed by channel B. In this connection, bias resistor 32 in Fig. 1 is chosen to be of relatively low value, and the wave 42 represents the voltage which would appear at the output terminal 22 if tube 24 were rendered non-conductive so that the upper plate (in the drawing) of capacitor 26 assumed A.-C. ground potential due to the low value of resistor 32. The sum of waves 40 and 42 is substantially equal to the video input wave 16.

Assume now that a spurious high-frequency component, such as noise, is added to the video input wave 16. This spurious component is represented in Fig. 3 by the sine wave 44. Since this noise component 44 has equal swings in the black and white directions, the average brightness of the white area of the image will not be changed by the noise. In the black area of the image, the upward swings of the noise wave 44 extend into the "blacker-than-black" region and have no effect, since they are beyond the cut-off of the image producing kinescope of the receiver or monitor device (not shown). The downward swings due to the noise, however, have the effect of increasing the brightness of the image, and the average brightness in the black area is shifted downward from the correct black level 20 to a new level which is indicated in Fig. 3 by the broken line 46.

Such a lowering of the average brightness from level 20 to a new position 46 impairs the contrast of the reproduced image. By means of the present invention, preferred embodiments of which will now be described, this effect is largely overcome by reducing the amplitude of the high-frequency components in the dark gray and black areas only. It will be appreciated that if the high-frequency components were attenuated for all image areas, the result would be an impairment of the resolution in all regions of the image.

Referring again to the tube 24 of Fig. 1, it has been stated that the value of its applied anode potential is dependent upon the position of potentiometer tap 34. In carrying out one form of the present inveniton, tap 34 is so adjusted that conduction of diode 24 is cut off at a level 48 (Fig. 3) which lies in the "dark gray" signal region between the white level 18 and the black level 20. The effect of thus controlling tube 24 is to alter the form of the wave normally passed by channel A (which includes tube 24) from that shown by the reference numeral 40 in Fig. 3 to that indicated by the reference numeral 50. Inasmuch as channel B is unaffected by a change in the bias on tube 24, wave 42 will continue to be passed thereby, and the output wave at point 22 will be a combination of waves 42 and 50, or, in other words, wave 52.

Now, if the high-frequency noise component 44 is assumed to be added to the video input wave 16, the output becomes wave 54. While it might be expected that the noise component 44 would be completely attenuated above the cut-off level 48, nevertheless this wave 44 actually has a residual amplitude which is due to the high-frequency response of channel B alone.

The average brightness of the image in the black region under the conditions just described is represented by the horizontal broken line 56. This horizontal line 56 is appreciably closer to the black level 20 than is the horizontal line 46 which represents the average brightness of the image when the tube 24 of Fig. 1 conducts freely for all levels. Hence, an improvement in the contrast of the reproduced image is brought about.

It will be noted that in all cases where the input signal remains below the cut-off level 48 (or, in other words, on the white side thereof), the output wave is substantially identical to the input wave.

In Fig. 4 is shown a modification of the circuit of Fig. 1 in which a resistor 58 is added in shunt with the tube 24. The function of this resistor 58 is to permit both spurious and useful high-frequency components to be passed by channel A at reduced amplitude even when the tube 24 is cut off. Thus, resistor 58 acts to lessen the effect normally provided by the circuit of Fig. 1 in cases where such a result is desirable.

Fig. 5 illustrates the manner in which an inductor 60 may be added to channel B in the circuit of Fig. 1, this inductor 60 being effectively connected in series with the resistor 28. The function of inductor 60 is to make the cut-off characteristics of channels A and B (Fig. 2) be sharper, as shown in Fig. 6. It will be appreciated that other types of filter arrangements, having the same or different characteristics than those shown in Figs. 2 and 6, may be substituted for the ones given, as long as the complementary relationship between the channels is retained.

While the present invention, as above described, provides means whereby the contrast, or tone value, of the reproduced image is improved, it results in some decrease in resolution in the dark areas of the image. This condition does not constitute a material disadvantage, however, since the sensitivity of the human eye decreases with a reduction in illumination and, hence, fine details in the dark areas of the image would not be seen by an observer even if they were accurately reproduced.

While the modifications of Figs. 4 and 5 have been described individually, it will be appreciated that these modifications may be combined into one circuit without departing from the spirit of the invention.

Having thus described my invention, I claim:

1. In a television system having two channels joined together at their inputs and outputs, the method of reducing the effects of noise in said system through which a composite video signal series is passed, which comprises dividing the said composite video signal series between said two channels each containing the said composite video signal, peak-limiting the said composite video signal in one of said channels, selecting from the peak-limited composite video signal in said one channel the high-frequency components thereof, selecting from the composite video signal in the other of said channels low-frequency components thereof which are substantially complementary to the high-frequency components of said video signal selected from said one channel, and combining the video signal components so selected.

2. In a television circuit for receiving a composite video signal series, the combination of a condenser and a peak-limiting device connected in series relation to form a first signal path, a resistor connected in parallel with said series combination of condenser and peak-limiting device to form a second signal path, and connections for applying the video signal series through both paths and to combine into a new composite series the output signals from each path.

3. A television system according to claim 2 in which said peak-limiting device comprises a unilateral conducting element.

4. In a television circuit for receiving a composite video signal series, the combination of a condenser and an amplitude-limiting device connected in series relation to form a first signal path, a resistor connected in parallel with said series combination of condenser and amplitude-limiting device to form a second signal path, connections for applying the video signal series through both paths and to combine into a new composite series the output signals from each path, and an inductor in series with said resistor, the series combination of resistor and inductor being connected in parallel relation with the said series combination of condenser and amplitude-limiting device.

5. In a television circuit for receiving a composite video signal series, the combination of a condenser and an amplitude-limiting device connected in series relation to form a first signal path, a resistor connected in parallel with said series combination of condenser and amplitude-limiting device to form a second signal path, connections for applying the video signal series through both paths and to combine into a new composite series the output signals from each path, and a second resistor in shunt with said amplitude-limiting device.

6. In a television system connected to receive a composite series of video signals, a serially connected combination of a condenser and an electron discharge device having at least an anode and a cathode, a connection from the anode of said electron discharge device to one plate of said condenser, a resistor, a connection from one terminal of said resistor to the cathode of said electron discharge device, a connection from the other terminal of said resistor to the remaining plate of said condenser, a connection for applying an operating potential to the anode of said electron discharge device, and a further connection for applying video signals to a point between said resistor and the cathode of said electron discharge device.

7. A television system according to claim 6, further comprising an inductor connected between said one terminal of said resistor and the point to which video signals from said source are applied.

8. A television system according to claim 6, further comprising an additional resistor connected across the anode and cathode of said electron discharge device.

9. In a circuit for a composite video signal which varies between a black level and a white level, said circuit having substantially complementary high-frequency and low-frequency parallel paths, the method for reducing nose effects which comprises dividing said signal between said paths, peak limiting only the signal components near the black level in the high-frequency path, and combining the components of said paths.

ALDA V. BEDFORD.

REFERENCES CITED

The following references are of record in the file of this patent:

UNITED STATES PATENTS

| Number | Name | Date |
|---|---|---|
| 2,171,671 | Percival | Sept. 5, 1939 |
| 2,226,255 | Percival | Dec. 24, 1940 |
| 2,269,011 | Dallos | Jan. 6, 1942 |
| 2,276,565 | Crosby | Mar. 17, 1942 |